United States Patent
Lehomme et al.

(10) Patent No.: US 7,598,947 B2
(45) Date of Patent: Oct. 6, 2009

(54) ADJUSTMENT SYSTEM FOR DISPLAY DEVICE

(75) Inventors: Francis Lehomme, L'Isle-Adam (FR); Thierry Dommanget, Auteuil-le-Roi (FR)

(73) Assignee: Johnson Controls Automotive Electronics, Cergy Pontoise Cedex (FR)

( * ) Notice: Subject to any disclaimer, the term of this patent is extended or adjusted under 35 U.S.C. 154(b) by 224 days.

(21) Appl. No.: 10/554,453

(22) PCT Filed: Apr. 20, 2004

(86) PCT No.: PCT/FR2004/000965

§ 371 (c)(1),
(2), (4) Date: Aug. 4, 2006

(87) PCT Pub. No.: WO2004/098206

PCT Pub. Date: Nov. 11, 2004

(65) Prior Publication Data

US 2007/0171160 A1    Jul. 26, 2007

(30) Foreign Application Priority Data

Apr. 25, 2003   (FR) .................................. 03 05120

(51) Int. Cl.
*G06F 3/038* (2006.01)
(52) U.S. Cl. ........................................ 345/204; 345/87
(58) Field of Classification Search ........... 345/87–102, 345/204

See application file for complete search history.

(56) References Cited

U.S. PATENT DOCUMENTS

| 4,119,808 A | * | 10/1978 | Atkin ....................... 324/76.57 |
| 5,369,432 A | | 11/1994 | Kennedy |
| 5,650,844 A | | 7/1997 | Aoki et al. |
| 5,764,209 A | * | 6/1998 | Hawthorne et al. ........... 345/87 |
| 6,882,176 B1 | * | 4/2005 | Norman et al. ............... 326/39 |
| 2003/0052904 A1 | * | 3/2003 | Gu .............................. 345/691 |

FOREIGN PATENT DOCUMENTS

WO   WO 02/47397 A2   6/2002

OTHER PUBLICATIONS

International Search Report by European Patent Office for PCT/FR2004/000965; mailed Oct. 8, 2004; 3 pages.

* cited by examiner

*Primary Examiner*—Alexander Eisen
*Assistant Examiner*—Kenneth B Lee, Jr.
(74) *Attorney, Agent, or Firm*—Foley & Lardner LLP (57) ABSTRACT

The invention relates to a system for pre-adjusting the video image adjustment parameters of a flat screen device for displaying images, consisting of a screen and electronic control circuits which transmit video signals to it and a reticle generator. According to the present invention, the device further includes acquisition means for acquiring the video signals, means for calculating values of the adjustment parameters and adjustment means for storing the values of the adjustment parameters in the electronic control circuits.

23 Claims, 4 Drawing Sheets

ADJUSTMENT SYSTEM FOR DISPLAY DEVICE

CROSS-REFERENCE TO RELATED PATENT APPLICATIONS

The present Application claims the benefit of priority to the following international Applications: PCT Patent Application No. PCT/EP2004/002161 entitled "Flat Screen Display Device and Adjustment System for Such a Device" filed on Apr. 20, 2004 which published under PCT Article 21(2) on Nov. 11, 2004 as WO 2004/098206 A1 in the French language and French Patent Application No. 03 05 120 filed on Apr. 23, 2003, which are hereby incorporated by reference herein in their entirety.

BACKGROUND OF THE INVENTION

The present-invention generally relates to a flat screen display devices consisting of with a-network of transistors, and the systems for workshop adjustment of the video images displayed therein.

Flat screen devices are increasingly being used in motor vehicles in order to display not only indications of vehicle driving conditions but also more elaborate information such as a roadmap or films, for example, requiring a good display quality of the video images.

So-called thin-film technologies known by the abbreviation TFT are employed in order to produce them or alternatively the screens consisting of a network of thin-film transistors TFT.

TFT screens are controlled and driven by electronic control circuits which prepare and transmit video image signals to be displayed in a predetermined format any may take into account parameters which modify the display quality and to compensate for the manufacturing tolerances. These parameters are, for example: luminosity, contrast, flicker, etc. It is workshop adjustment, or pre-adjustment, which makes it possible to fix their initial values.

Most of the means for pre-adjusting flat screen display devices currently comprise a reticle generator for displaying images making it possible to identify the defects due to poor adjustment of the aforementioned parameters. Displaying the generated reticles on the screen makes it possible to manually adjust the value of these parameters by utilizing potentiometers provided in the electronic control circuits.

These manual operations can be time-consuming, expensive and give rise to poor homogeneity of the devices upon leaving the workshop. Furthermore, the parameters adjusted in this way are not constant over time.

SUMMARY

One embodiment of the present invention relates to a system for pre-adjusting the video image adjustment parameters of a flat screen device for displaying images. The display device includes a screen and electronic control circuits which transmit video signals to the display device and a reticle generator. The reticle generator further includes acquisition means for acquiring the video signals, means for calculating values of the adjustment parameters and adjustment means for storing the values of the adjustment parameters in the electronic control circuits.

In one arrangement, as a function of the reticle sent to the flat screen device, and the video signals received by the screen, the calculation means calculate, new values of the parameters and the adjustment means replace the old values of the parameters in the electronic control circuits with these new values. The calculation is repeated so long as the values of the adjustment parameters are outside of a predetermined range.

In one exemplary embodiment of the present invention, a system for pre-adjusting the video image adjustment parameters of a flat screen device for displaying images is provided. The system includes: a screen, electronic control circuits which transmit video signals to the screen and a reticle generator. The reticle generator has acquisition means for acquiring the video signals. Moreover, a means for calculating values of the adjustment parameters and adjustment means for storing the values of the adjustment parameters in the electronic control circuits are included within the system.

Another exemplary embodiment of the present invention, a flat screen device suitable for displaying images is provided. The flat screen device includes a screen and electronic control circuits which deliver video signals to it. Further included is at least one programmable logic circuit designed to generate electrical voltages representing the values of the adjustment parameters.

Another exemplary embodiment of the present invention, includes an adjustable display device which has a screen configured in a manner to display images; at least one control circuit configured to transmit video signals to the screen; acquisition means for acquiring the video signals; calculating means for deriving adjustment parameters; and adjustment means for storing the values of the adjustment parameters.

The electronic control circuits preferably includes a circuit for rendition of the adjustment parameters, which are designed to digitally store the values of the calculated (or predetermined) parameters.

In some embodiments, manual workshop pre-adjustments may no longer be necessary.

Also preferably, the adjustment means includes a simulator of the rendition circuit.

In some embodiments, there is no need to modify the rendition circuit of the flat screen device during the repetition of the calculations so long as the values of the parameters are not final, i.e. so long as the adjustment has not been completed, which allows great freedom in the choice of its technology.

In some embodiments, the parameter rendition circuit includes a programmable logic circuit and the simulator includes at least one programmable logic circuit emulating the programmable logic circuit.

In particular, the two aforementioned programmable logic circuits are of the same type, which simplifies the system. Furthermore, the simulator preferably consists of the emulator alone.

The adjustment means may include a module for writing to the programmable logic circuit in order to carry out modifications of certain electrical circuits among predetermined electrical circuits of the programmable logic circuit.

In some embodiments, the calculation means includes a programming function for enabling the simulator on the electronic control circuits and disabling the rendition circuit during the adjustment of the parameters.

In some embodiments, the programming function enables the programmable logic circuit on the electronic control circuits and disables the programmable logic circuit during the adjustment of the values of the parameters.

In some embodiments, in both cases, the programmable logic circuit of the simulator or the simulator and the electronic control circuits are connected together via an interface of the nail bed type.

In some embodiments, the calculation means (are designed to control the reticle generator.

In some embodiments, the system comprises optical measurement means connected between the calculation means in order to adjust the flicker parameter.

Some embodiments also relate to a flat screen device for displaying images. The device includes a screen and electronic control circuits which deliver video signals to it and depending on adjustment parameters, characterized in that the electronic control circuits comprise at least one programmable logic circuit designed to generate electrical voltages representing the values of the adjustment parameters.

In some embodiments, the electrical voltages representing the values of the adjustment parameters are generated from pulse width modulation (PWM) signals and the modulations obtained are converted into a DC voltage by filters, for example first-order filters.

In some embodiments, it is the duty ratios of the pulse width modulations which represent the values of the adjustment parameters.

In some embodiments, the duty ratios of the pulse width modulations are digitally stored in the programmable logic circuit. In particular, the duty ratios of the pulse width modulations are digitally stored by modifying certain electrical circuits among predetermined electrical circuits of the programmable logic circuit.

The parameters are thus hard-stored in the circuit.

In some embodiments, the modifications of the electrical circuits are carried out on the successive SET or RESET inputs of bistable circuits and the programmable logic circuit of the rendition circuit is an EPLD (erasable programmable logic device or circuit) or a CPLD (complex programmable logic device, or programmable logic chip).

BRIEF DESCRIPTION OF THE DRAWINGS

The invention will be understood more clearly with reference to the following description and the appended drawings, in which.

DETAILED DESCRIPTION

In the FIGURES, identical parts are provided with the same reference numbers and they are generally also only described once in each exemplary embodiment.

Figure 1:
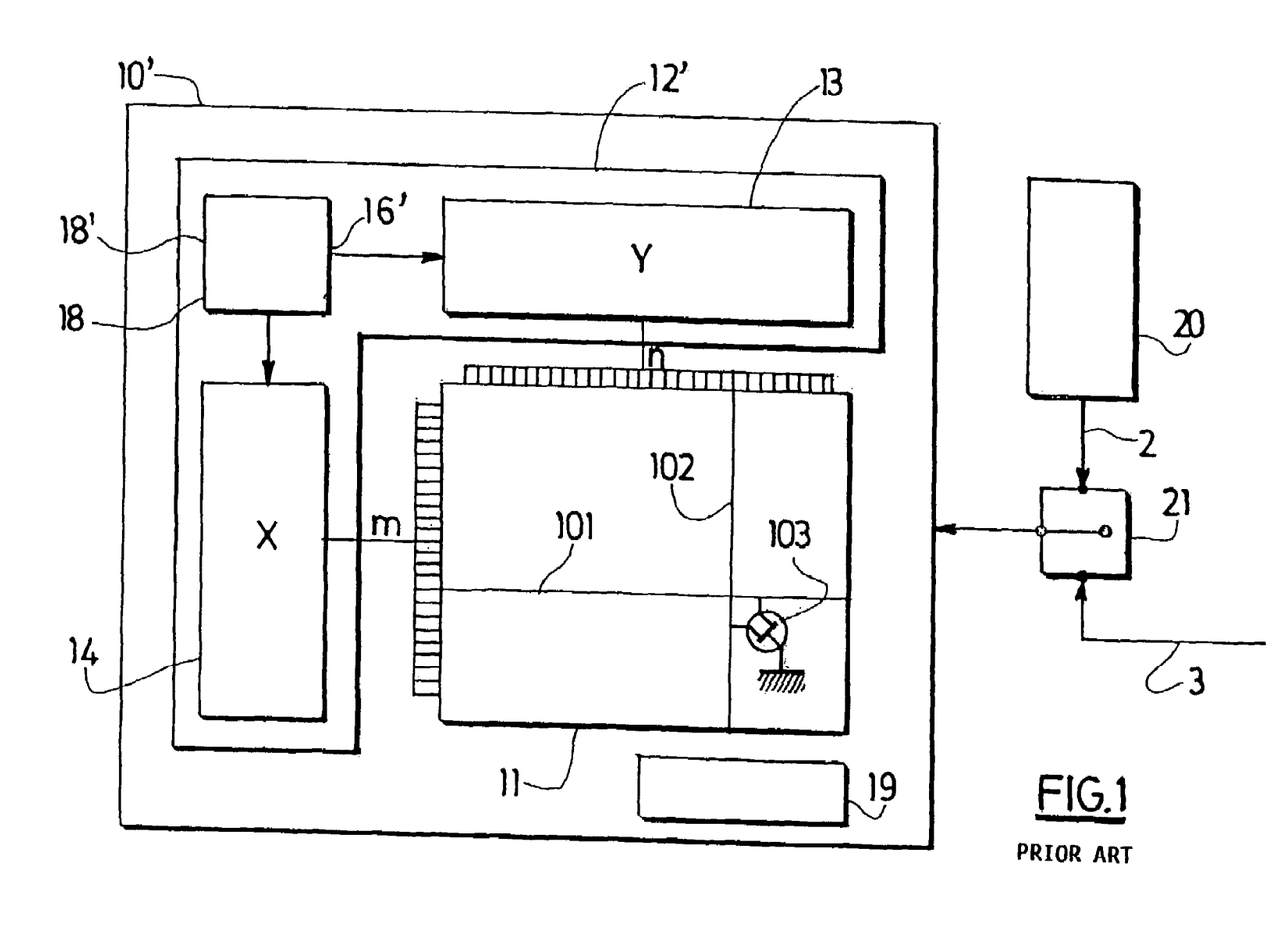
FIG. 1 is a flat screen device of the TFT type utilizing a prior art system for the workshop pre-adjustment of the device.

Referring to FIG. 1, a prior art display device 10 with a flat screen 11 having TFT technology includes an electronic circuit 12 to control the circuits 13 and 14 for generating m and n of row X and column Y input signals of the screen. The input signals are synchronized by synchronization signals.

Each of these X inputs signals, e.g. 101, or Y inputs, e.g. 102, is connected to n or m TFT transistors 103, and the assembly constitutes a matrix array of transistors each producing one colour pixel of the screen.

The electronic control circuit 12 also comprises a circuit 18 or 18' for rendering adjustment parameters, generally at least eight, such as the luminosity, contrast, flicker, etc. The circuit 18 or 18' is also coupled to the generation circuits 13 and 14 so that they take them into account.

A service circuit 19 is lastly provided which includes a clock or timer.

With prior art display devices, such as that illustrated in FIG. 1, the circuit 18' comprises as many potentiometers as there are parameters, and the position of the cursors of these potentiometers is adjusted by hand(i.e., one by one) in response to the display of a reticle image corresponding to the parameter to be adjusted, which is sent by a reticle generator 20 whose output 2 is connected to the device 10, for example, by a commutator 21 in substitution for an input 3 of video image signals sent when the device is under normal usage.

Figure 2:
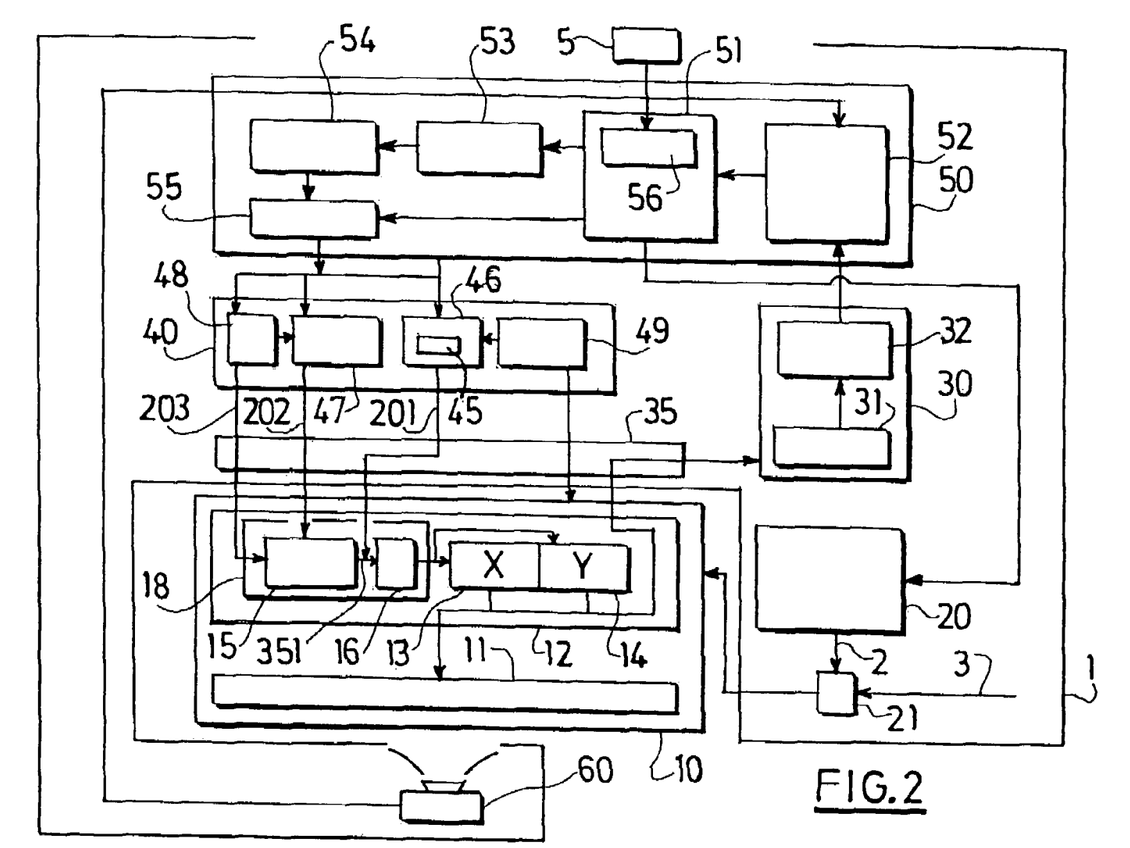
FIG. 2 is a system for pre-adjusting the flat screen device according to an exemplary embodiment.

According to an exemplary embodiment, the potentiometer circuit 18' is replaced by a circuit 18 which has similar parameter rendition functions but without potentiometers. FIG. 2 schematically illustrates the pre-adjustment system according to the exemplary embodiment. Circuit 18 for rendering the parameters of the flat screen device 10 includes a programmable logic circuit 15 and at the output of the latter a filtering block 16 which delivers the values of the adjustment parameters in the form of DC voltages identical to the voltages delivered by the circuit 18' to the input circuits 13 and 14 of the electronic control circuit 12.

The programmable logic circuit 15 may be an EPLD or a CPLD. The logic is programmed at the end of the adjustment and the program contains the values of the parameters.

The pre-adjustment system 1, as shown in FIG. 2, includes a reticle generator 20 and means 30 for acquiring the X and Y input signals. Also included are analogue-digital converters 31 synchronized with the synchronization signals of the circuit 12 and memories 32 for storing the acquired digital data, which are connected to calculation means 50. In the illustrated embodiment a PC (personal computer) by an IEE488 connection is utilized.

The pre-adjustment system 1 also includes adjustment means 40 which are connected on one end to the calculation means by a serial connection of the RS232 type and, on the other end, directly to the tracks of the control circuits 12 of the flat screen device 10 using an interface 35 of the nail bed type. This interface 35 furthermore allows direct connection of the X and Y input circuits 13 and 14 and the acquisition means 30.

The PC 50 is connected to the reticle generator 20 to receive a reticle selection command from it. Moreover, in order to provide an optical measurement means therein, a camera 60 arranged facing the screen 11 is coupled to the PC 50.

More precisely, the PC 50 includes a supervisor 51 containing a man-machine interface 56 connected to a control keyboard 5 of the PC, an acquisition function 52, a calculation function 53 for calculating new parameter values as a function of the data transmitted by the acquisition function 52, a memory 54 for calculation results, and a programming function 55 using the calculation results in order to generate adjustment programs and commands to be executed by the adjustment module 40.

The adjustment module 40 is an electronic unit which includes a service means 49 such as electrical power supplies, clocks, etc. The clock is suitable for timing a universal list of electronic circuits. For example, when operating at 8 Mhz, in order to ensure operation of the adjustment module and also capable of disabling the circuit 19 of the device 10, a programmer 48 for the EPLD or CPLD programmable logic circuit, a writing module 47 of the EAPROM type (electrically alterable programmable read only memory), and a simulator 46 of the rendition circuit 18 are included therein. The simulator 46 also receives the supplies and clocks of the service means 49 in order to synchronise it therewith. It preferably consists of an EPLD or CPLD programmable logic circuit 45 emulating the program or logic circuit 15. The logic circuit is preferably an EPLD or CPLD.

The circuits 15 and 45 are of the same type. Emulation of one by the other is thus simpler. The circuit 45 may be of unlimited capacity, however, whereas the circuit 15 located in the flat screen device will typically have a minimal capacity for reasons of industrial manufacturing cost. There is less difficulty in programming the circuit 45, in particular by the programmer 48.

The programmable logic circuit 15 is designed to be programmed in at least two ways: a conventional way by the programmer 48 and a complementary way with circuit alteration by the writing module 47. To this end, referring to FIG. 3, the programmable logic circuit 15 being an EPLD or CPLD, includes circuits of the bistable type 151. Each parameter assigned to one of these bistable circuits 151 comprising at least four consecutive stages. These stages are of the RS bistable type (SET-RESET flip-flop). By electrical alteration of the circuit of the R or S inputs of each stage, and using the connections 202 and 352 between the module 47 and the circuit 15, the writing module 47 can modify the polarities 154 of these R or S inputs, for example change their "1" logic level to an "0" logic level and thus display a binary quantity of four bits, a dynamic range of $2^4$, for the bistable circuit 151 in relation with the value of the parameter assigned to the circuit. The output of the bistable circuit is a pulse width modulation (PWM) signal applied, to a first-order filter 161 associated with the same parameter in the filtering block 16. The output of each filter associated with each parameter is a voltage Vp representing the value of the parameter.

Figure 3:
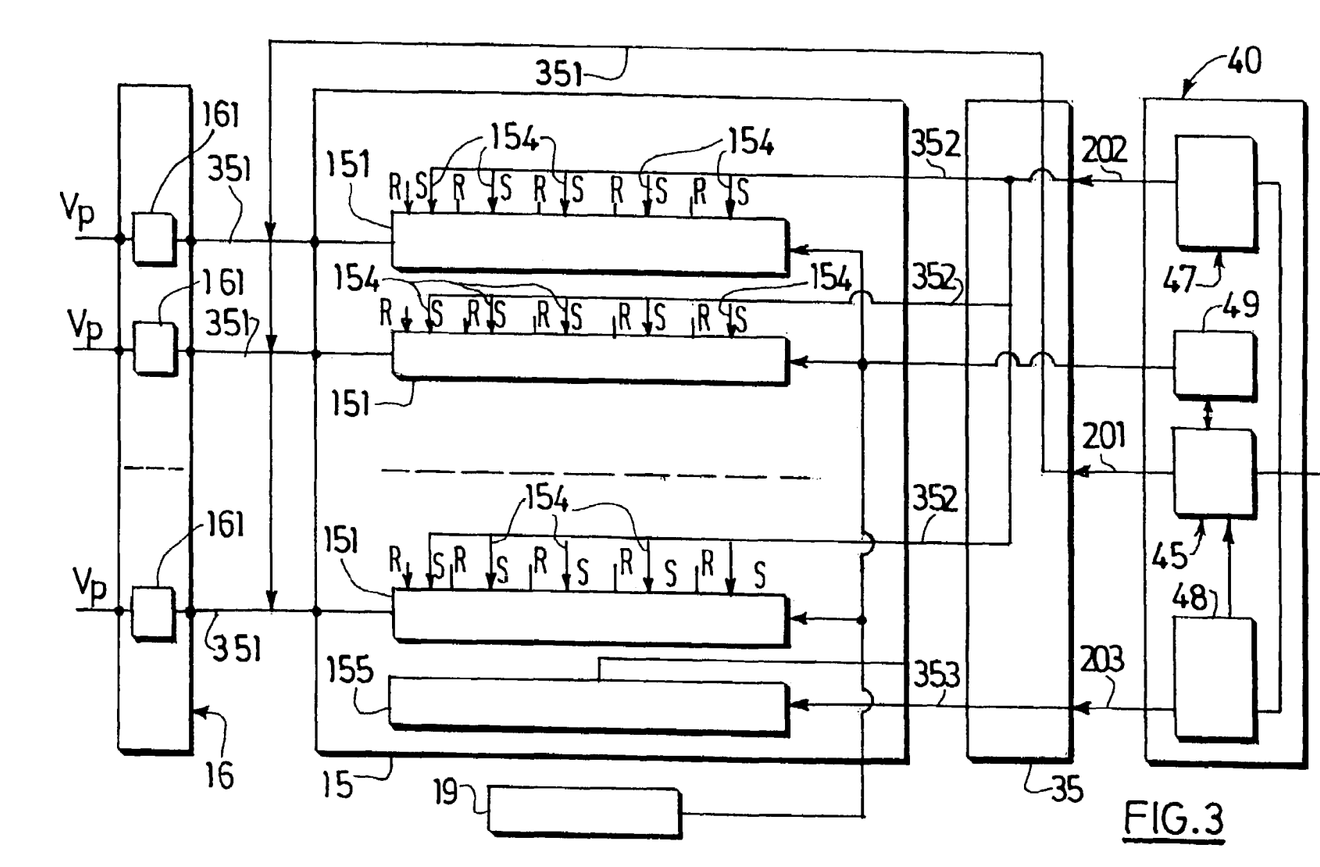
FIG. 3 illustrates a the circuit for rendering adjustment parameters in connection with the adjustment means during a pre-adjustment.

The programmable logic circuit 15 being an EPLD or CPLD includes a program 155 loaded by the programmer 48 through the connection 203 from the adjustment means 40 and 353 with the interface 35. The program 155 controls the use or non-use of the clock signals of the service circuit 19, i.e. enabling or disabling of the circuit 15.

The connections 201 short-circuit the outputs 351 of the circuit 15 and connect the output of the circuit 45 directly to the inputs of the filtering block 16, when the nail bed 35 is in place and when the circuit 15 has been disabled. The connections 201, 202, 203 include wires between the adjustment means 40 and the interface 35, whereas their extensions 351, 352, 353 between the interface 35 and the programmable logic circuit 15 are produced by placing nails of the nail bed directly on the tracks of the circuit 15. When .the nail bed is in place, the service means 49 disables the circuit 15 and the service circuit 19.

Further provided is a flat screen device 10 and more particularly the circuit 18, for rendering a parameter P. In order to time the electronic circuits in their entirety, a counter of the service circuit 19 or the service circuit 49—depending on whether the situation is normal use or a pre-adjustment phase—delivers counting signals whose value, V, varies from 0 to the amplitude $2^5$ to 1 modulo $2^5$ over a certain counting period T. The signal values are applied to the 5 inputs of an RS bistable circuit 151 having five inputs, which is assigned to this parameter P.

In response to these counting signals, the bistable circuit 151 delivers an output signal changing the state from the logic level 0 to the logic level 1 when the value V is equal to 0, and in the opposite direction when it is equal to a value displayed on the SET inputs of the said bistable circuit by means of a predetermined polarity, at a time to in the period T for resetting the value V.

In order to hard-store the parameter, the polarity of some of the SET inputs 1, 2, 3, 4, 5 of the bistable circuit of the parameter is fixed by altering the electrical circuits of the programmable electronic circuit 15 via action by the module 47. The corresponding SET inputs are polarized to logic levels "1" instead of the logic level "0". A value corresponding to the desired instant to in the period T is thus hard-stored in order to determine a duty ratio RC as defined below: the output signal of the circuit 151 is inverted in order to give a pulse modulation signal of width and frequency 1/T. The duty ratio RC of this pulse width modulation is: $RC=t_0/T$ The PWM signal is filtered in the integrating filter 161 of the filtering block 16 in order to give a voltage Vp proportional to RC, which is transmitted to the X and Y input circuits 13 and 14 instead of the voltage of the potentiometer as in the prior art (as illustrated in FIG. 1).

The programmable logic circuit 45 can function in the same way as the circuit 15 and can thus emulate it, even though the storage of the SET inputs may then be carried out in the registers of a more powerful EPLD or CPLD in the course of the adjustment.

Figure 4:
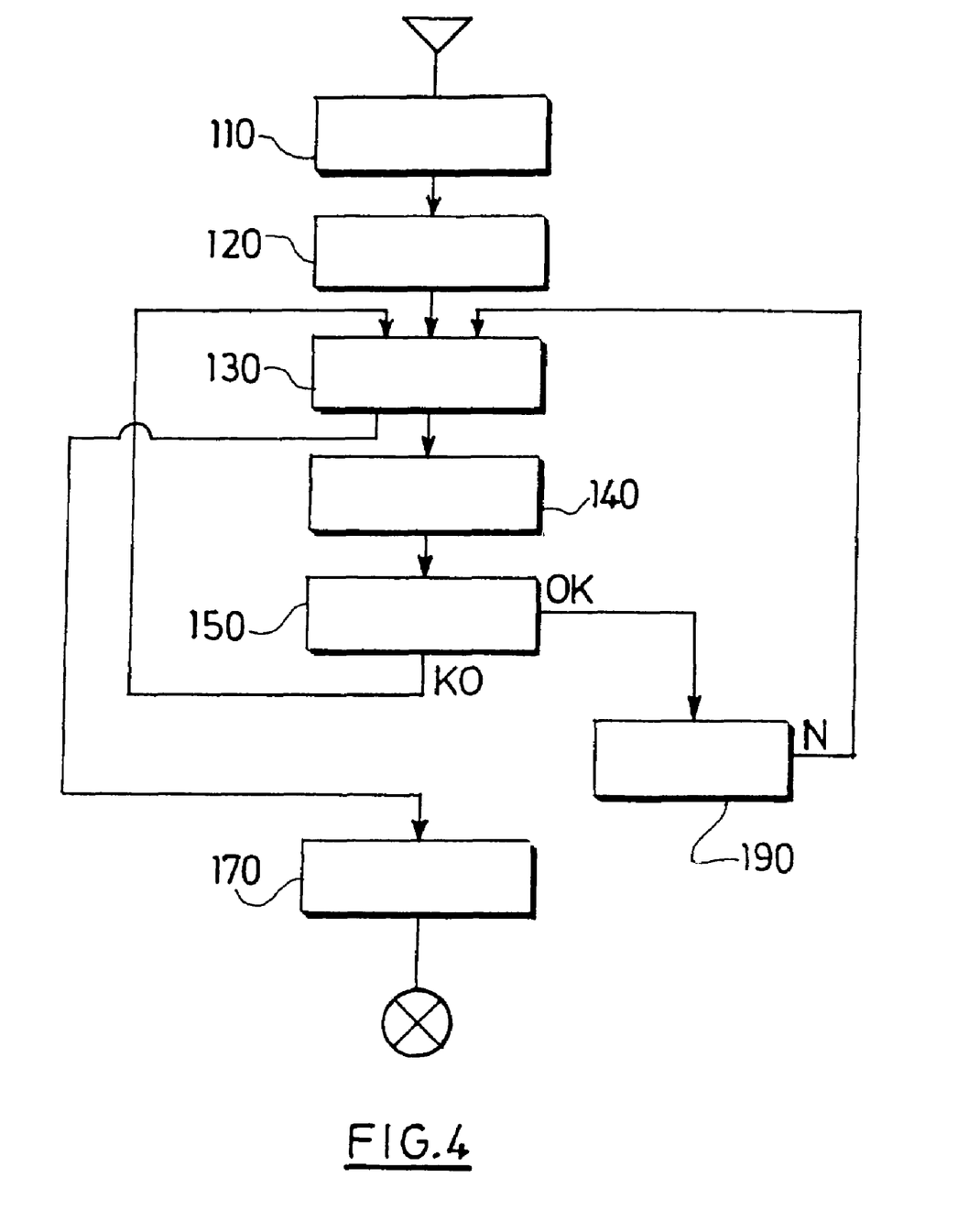
FIG. 4 illustrates a representative a flow chart of the execution of the steps for pre-adjusting a flat screen device utilizing a pre-adjustment system.

In order to enable this emulation, i.e. more generally in order to pre-adjust the flat screen device 10, referring to FIG. 4 and FIG. 2, in a step 110 the nail bed 35 is put in place. The specifications of the adjustment to be carried out are acquired via the keyboard 5. For example, rated values of the pre-adjustment parameters which are stored in the memory of the interface 56 and the supervisor 51 is activated. During a step 120, the latter causes the compilation of programmes by the programming function 55 and the programming of the programmable logic circuits 45 and 15 by the programmer 48, thereby, program 155 disables the circuit 15.

During step 130, the supervisor commands the reticle generator 20 to send a reticle to the screen 11 of the device 10, corresponding to the first parameter to be adjusted or commands a complementary reticle for the current parameter.

Steps 140 to 150 are then repeated iteratively until a suitable (or predetermined) result, examples of which are defined below, is obtained.

During step 140, after a time for establishing the image formed using the circuits 13 and 14 and further upstream using the circuit 45 programmed with the initial values of the parameters, the circuit 15 being disabled, the supervisor activates the acquisition means 30 in order to acquire the X and Y signals via the channel of the nail bed 35 during a predetermined time. The signals are converted by the converter 31 and stored in the memory 32.

During step 150, the supervisor then initiates the corrective calculations for the current parameter, which are performed by the calculation means 53 on the basis of the data in the memory 32, which is stored therein in a memory of the acquisition function 52, and the specifications. If it is a parameter requiring use of the camera 60 or other optical measurement means, the memory of the function 52 then receives its data from this camera or these optical measurement means via an IEEE 488 connection.

If the specifications are verified, i.e. if the correction found is zero or less than a minimum threshold, then operation proceeds to a writing step 190 in which the value of the parameter is translated into a duty ratio value RC, then into a binary number to be written onto the SET inputs 154 of the bistable circuit 151 to which the parameter is been assigned, and the binary number is hard-written into the circuit 15 by the writing module 47, and then step 130 is repeated for another parameter to be adjusted. If a correction is still to be made, then operation proceeds again to the step 130 in order to use another complementary reticle.

When it is detected in step 130 that all the reticles have been used, or that all the parameters have been processed and written into the circuit 15, then operation proceeds to a step 170 in which the supervisor, via the programming function 55, commands the programming by the programmer 48 of a program 155 of the programmable logic circuit 15 and the nail bed 35 is removed. The said program 155 does not restart the services 19 until the nail bed has been removed.

It should be understood that the construction and arrangement of the elements of the display device in the exemplary embodiments are illustrative only. Although only a few embodiments of the present invention have been described in detail in this disclosure, many modifications are possible without materially departing from the novel teachings and advantages of the subject matter recited in the claims. For example, the temperature sensing device may be adapted for use in other systems or locations, may incorporate additional temperature sensors or other inputs, or may include other variables or factors in the extrapolation function. Accordingly, all such modifications are intended to be included within the scope of the present invention as defined in the appended claims. Unless specifically otherwise noted, the claims reciting a single particular element also encompass a plurality of such particular elements. Moreover, claims reciting that one element is coupled to another should be interpreted to mean that the elements are selectively coupled to each other and may be uncoupled or disconnected at any point. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

The invention claimed is:

1. A system for pre-adjusting video image adjustment parameters of a flat screen device for displaying images, comprising:
    a screen;
    electronic control circuits which transmit video signals to the screen;
    a reticle generator, having acquisition means for acquiring the video signals;
    means for calculating values of the adjustment parameters; and
    adjustment means for storing the values of the adjustment parameters in the electronic control circuits,
    wherein the calculation means comprises a supervisor designed to repeat the calculations so long as the values of the adjustment parameters are within a predetermined range,
    wherein the electronic control circuits comprise a circuit for rendition of the adjustment parameters, which is designed to digitally store values of the calculated adjustment parameters, and
    wherein the adjustment means comprises a simulator of the circuit for rendition.

2. The system of claim 1, wherein the circuit for rendition comprises a programmable logic circuit and the simulator comprises at least one programmable logic circuit emulating the programmable logic circuit.

3. The system of claim 1, wherein the electronic control circuits comprises a circuit for rendition of the adjustment parameters, which is designed to digitally store values of the calculated adjustment parameters.

4. A system for pre-adjusting video image adjustment parameters of a flat screen device for displaying images, comprising:
    a screen;
    electronic control circuits which transmit video signals to the screen;
    a reticle generator, having acquisition means for acquiring the video signals;
    means for calculating values of the adjustment parameters; and
    adjustment means for storing the values of the adjustment parameters in the electronic control circuits,
    wherein the adjustment means comprises a simulator of a rendition circuit and consists essentially of an emulator.

5. The system of claim 4, wherein the circuit for rendition comprises a programmable logic circuit and the simulator comprises at least one programmable logic circuit emulating the programmable logic circuit.

6. The system of claim 5, wherein the programmable logic circuit and the at least one programmable logic circuit are of the same type.

7. The system of claim 6, wherein the simulator comprises the emulator.

8. The system of claim 5, wherein the simulator comprises the emulator.

9. The system of claim 5, wherein the simulator comprises the emulator.

10. The system of claim 5, wherein the adjustment means comprises a module for writing to the programmable logic circuit in a manner to carry out modifications of selected electrical circuits among predetermined electrical circuits of the programmable logic circuit by which values of the calculated adjustment parameters are stored.

11. The system of claim 7,
    wherein the adjustment means comprises a module for writing to the programmable logic circuit in a manner to carry out modifications of selected electrical circuits among predetermined electrical circuits of the programmable logic circuit by which values of the calculated adjustment parameters are stored.

12. The system of claim 11, where in the programmable logic circuits are of the EPLD or CPLD type.

13. The system of claim 5, wherein the programmable logic circuits are of the EPLD or CPLD type.

14. The system of claim 4, wherein the calculation means comprises a programming function for enabling the simulator on the electronic control circuits and disabling the rendition circuit during adjustment of the adjustment parameters.

15. The system of claim 12, wherein the calculation means comprises a programming function for enabling the simulator on the electronic control circuits and disabling the rendition circuit during adjustment of the adjustment parameters.

16. The system of claim 4, wherein the calculation means comprises a programming function for enabling the programmable logic circuit on the electronic control circuits and disabling the programmable logic circuit during adjustment of the adjustment parameters.

17. The system of claim 12, wherein the calculation means comprises a programming function for enabling the programmable logic circuit on the electronic control circuits and disabling the programmable logic circuit during adjustment of the adjustment parameters.

18. The system of claim 16, wherein any one of the programmable logic circuit, the simulator, and the electronic control circuits are connected together via an interface of the nail bed type.

19. The system of claim 18, wherein the calculation means are designed to control the reticle generator.

20. The system of claim 16, further comprising a programmable logic circuit; wherein any one of the programmable logic circuit, the simulator, and the electronic control circuits are connected together via an interface of the nail bed type.

21. The system of claim 1, wherein the calculation means are designed to control the reticle generator.

22. The system of claim 1, wherein the system comprises optical measurement means connected between the calculation means in order to adjust at least one adjustment parameter configured in a manner to alter the flicker on the screen.

23. The system of claim 20, wherein the system comprises optical measurement means connected between the calculation means in order to adjust at least one adjustment parameter configured in a manner to alter the flicker on the screen.

* * * * *

UNITED STATES PATENT AND TRADEMARK OFFICE
CERTIFICATE OF CORRECTION

| | | |
|---|---|---|
| PATENT NO. | : 7,598,947 B2 | Page 1 of 1 |
| APPLICATION NO. | : 10/554453 | |
| DATED | : October 6, 2009 | |
| INVENTOR(S) | : Lehomme et al. | |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 224 days Delete the phrase "by 224 days" and insert -- by 570 days --

Signed and Sealed this

Thirteenth Day of July, 2010

David J. Kappos
*Director of the United States Patent and Trademark Office*